United States Patent [19]

Doyle et al.

[11] 3,900,251

[45] Aug. 19, 1975

[54] SYNCHRONIZER SYSTEM FOR A MOTION PICTURE SOUND RECORDER

[75] Inventors: Robert O. Doyle; Jordan Kirsch, both of Cambridge, Mass.; Wendl Thomis, Fort Lee, N.J.

[73] Assignee: Super 8 Sound, Inc., Cambridge, Mass.

[22] Filed: Mar. 29, 1974

[21] Appl. No.: 456,035

[52] U.S. Cl. ...................... 352/12; 352/19; 352/22; 352/31

[51] Int. Cl. .......................................... G03b 31/00

[58] Field of Search ............. 352/12, 19, 20, 22, 31

[56] References Cited

UNITED STATES PATENTS

| | | | |
|---|---|---|---|
| 3,583,796 | 6/1971 | Colodner | 352/19 |
| 3,722,987 | 3/1973 | Cap | 352/20 |

*Primary Examiner*—Monroe H. Hayes

*Attorney, Agent, or Firm*—Abraham Ogman, Esq.

[57] ABSTRACT

The invention is directed to a synchronizer for a sound and motion picture recording system utilizing separate sound and motion picture apparatus. In a sound motion picture system, the synchronizer operates to generate a driving voltage for the sound recorder motor, which is representative of the phase difference between synchronizing (sync) signals derived from the motion picture camera and reference signals which are derived from the sound recorder. A phase locked system is provided which matches the sync and reference signals and thereby synchronizes or matches the sound recorder to the sync signals.

13 Claims, 5 Drawing Figures

SYNCHRONIZER SYSTEM FOR A MOTION PICTURE SOUND RECORDER

Figure 1:
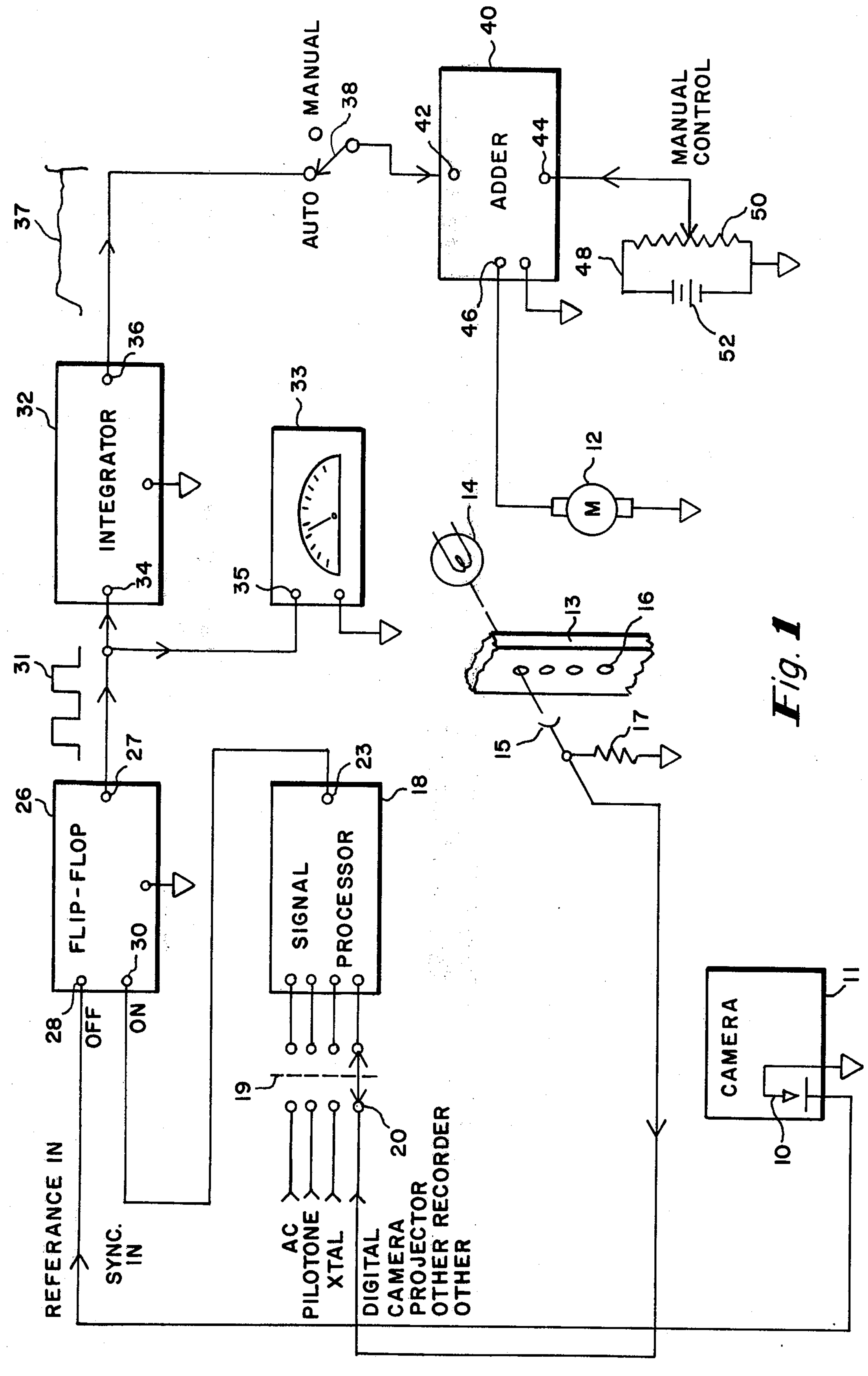

Separate sound and motion picture apparatus is preferred by professional and semi-professional movie makers. Separate apparatus provides a movie maker the desired degree of versitility and flexibility, particularly in editing.

There are a large number of techniques for operating separate sound and motion picture apparatus. In some cases transfer recorders are used to effect synchronization. In other cases both the camera and sound recorders are tied to an external signal such as a crystal or line voltage. Mechanical interlocking is yet a third technique.

All of the foregoing suffer from one or more of the following: complexity, high equipment cost, complex and costly editing required. Some Super 8 systems use cumbersome methods of counting invisible magnetic pulses. These are confusing and cumbersome, at best. The few Super 8 systems that do use sprocketed magnetic tape use unorthodox editing equipment since the magnetic tape is not the same size and format as the film. Moreover, the tape is limp and fragile and difficult to handle.

The Super 8 motion picture camera is superbly suited for the professional and semi-professional movie maker because it is a highly sophisticated, high quality, well engineered and relatively low cost machine. Heretofore, such cameras lacked a highly sophisticated, high quality, well engineered and low cost sound recorder capable of providing a synchronized separate sound recording.

One Super 8 system is described in U.S. Pat. No. 3,751,143, entitled, "Synchronized Sound and Picture Film Recording and Projection System." In the patented system, both the camera and sound recorder are locked to a crystal controlled preselected frame rate. The camera and sound recorder each contain self-synchronizing circuits which require an accurate time reference to control the preselected frame rate.

In contrast, in the present invention, the sound recorder locks on directly on the frame rate of the camera or a projector. These frame rates may vary or can be made to vary and the sound recorder syncrhonizing circuit will follow faithfully.

It is an object of the invention to provide a synchronizer for a motion picture sound recorder, for a synchronized sound and motion picture recording system, which avoids the disadvantages and limitations of prior devices.

It is another object of the invention to provide a synchronizer for a motion picture sound recorder which provides precise matching of the speed of a separate magnetic sound medium directly to the speed of a motion picture film on a once-per-frame basis.

It is yet another object of the invention to provide a synchronizer for a motion picture sound recorder which utilizes widely distributed cameras with no modifications to the cameras.

It is yet another object of the invention to provide a synchronizer for a motion picture sound recorder which may be synchronized directly to a film projector with an inconsequential modification to the projector.

It is still another object of the invention to provide a synchronizer for a motion picture sound recorder which yields separate sound and motion picture recordings that may be edited by mechanical means.

It is still another object of the invention to provide a sound motion picture system which produces a separate sound recording that can be edited mechanically with the motion picture film in conventional synchronizers/counters and editing tables.

It is another object of the invention to provide a synchronizer for a motion picture sound recorder which utilizes a magnetic recording medium on film stock and matches its sprocket hole rate to a motion picture film frame rate sync signal.

Other objects of the invention are to provide a sound recorder for a sound motion picture system which:

1. uses fully coated magnetic film as the recording tape and matches the sprocket holes rate of the magnetic full-coat directly to the sprocket hole rate of the camera film;
2. is compatible with standard motion picture frame rate sync signals, i.e., crystal or pilotone signals;
3. includes means for compensating for momentary losses of reference signals;
4. utilizes a phased locked control system which is responsive to the phase difference between a sync signal and an internally generated reference signal to match the sound recording rate directly to the rate of sync signal;
5. provides precise matching of the sound recorder tape directly to the motion picture film without introducing spurious effects such as wow and flutter; and
6. provides precise matching of the sound recorder tape directly to the motion picture film without intermediate sync circuitry.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 1 is a block representation of a synchronized sound motion picture sound system which embodies the principles of the present invention; and FIGS. 2A – 2D are a number of charts that are useful in explaining the operation of the FIG. 1 synchronizer.

Though the invention may be used on 16 and 35 mm systems, it will be described in connection with a Super 8 system as this medium is fast becoming popular because of its low cost, excellent equipment, versitility and equipment availability.

Further, the following discussion will center around the use of the magnetically coated Super 8 film stock (known as Full-Coat in the industry) as the sound recording medium. Identical sprocket holes in the full-coat and in the motion picture film permit mechanical coupling for simplified synchronization and editing. However, inventive concepts may be used with any pair of compatible indexing means to effectuate synchronization.

A block representation has been used in FIG. 1 because the circuits, per se, represented by the blocks, are conventional. Many useful forms of these circuits are available in designer handbooks and texts.

Referring to FIG. 1, there is depicted a synchronized sound motion picture system embodying the principles of the present invention. A motion picture recording means is depicted by a motion picture camera 11. The camera 11 includes synchronizing means in the form of a once-a-frame switch, for supplying a train of sync signals representative of the picture recording, or frame rate of the camera. The once-per-frame switch may be a PC switch used for electronic flash in the single frame mode, or a voltage pulse generated each frame by some cameras. The system is also compatible with cameras that are cyrstal controlled or include a pilotone generator. All of the foregoing sources of the sync signal require no modification of the camera. There are some twenty such Super 8 cameras.

Furthermore, the sync signals may be obtained through the use of an intermediate special sync cassette. The special cassette is used to supply the record and subsequently sync signals to the sound recorder. The foregoing are merely illustrative and not exclusive of synchronizing means that may be compatible with the invention concept.

The important criteria is that the camera (or projector) frame rate is the primary sync signal on which all other signals and rates are compared. The camera frame rate is not controlled and may vary with battery voltage changes, friction, load, etc. The synchronized sound recorder slavishly follows frame rate variations.

Coupled to the camera in FIG. 1 is sound recording means having means for matching the sound recording rate to the rate of the sync signals. In the preferred embodiment, the sync signals are derived from the camera and occur at the frame rate, as explained above.

In the preferred embodiment, a commercially available magnetic tape recorder was modified to accept a full-coat magnetic tape recording medium. Full-coat is made by depositing a magnetic recording material on film stock. The magnetic recording material replaces the conventional emulsion. There is no picture area. Full-Coat tape is available in several film sizes, including Super 8. Since full-coat magnetic tape has precisely the same width, sprocket hole size, and distance between holes as film, it will run through the same machines that accept film, including projectors, synchronizers/counters and editing tables.

The Sony TC800B tape recorder was selected to accommodate the full-coat magnetic film as its speed was already servo controlled electronically and therefore easily adaptable. The quarter-inch guideposts were elongated to accommodate the slightly wider full-coat magnetic film. It is to be emphasized that other available magnetic tape recorders may be used.

To offer precise matching of the sound recorder magnetic tape to the film speed or to the repetition rate of sync signals, the tape recorder is also provided with a servo control circuit of the type depicted in FIG. 1.

The sound recording tape deck is shown, schematically, by the tape driving motor 12 and the magnetic full-coat film 13. Synchronizing means for supplying reference signals comprise a photoelectric pulse generator having a light source 14 and photosensor 15, situated on opposite sides of the full-coat film 13 and aligned with the sprocket holes 16. Each time light from the light source 14 passes through a sprocket hole 16 and impinges on the photosensor cell, a reference pulse is generated across resistor 17. The sound recorder servo control system comprises a signal processor 18, a flip-flop 26, an integrator 32, an adder 40 and a manual control 48.

The operation and configuration of the sound recorder servo control system is shown in detail in connection with the block diagram in FIG. 1 and the series of charts in FIGS. 2A through 2D.

Synchronizing (sync) signals for the servo control system may be derived from a number of sources as was explained previously. In FIG. 1 the sync signal from a once-a-frame switch 10 in the camera 11 is coupled through a sync selector terminal 20 of switch 19 and terminal 21 of pulse shaping circuitry directly to the input terminal 30 of the flip-flop 26. Alternatively, sync signals from other sources may be coupled through terminal 22 of the sync selector switch 19 to an input terminal of the signal processor 18. These signals are processed and shaped and amplified, as required, in the signal processor 18 to provide a 24 Hz signal suited for the flip-flop 26.

The reference signals from the photosensor 15 are coupled to an input terminal 28 of the flip-flop 26.

The flip-flop 26 and the integrator 32 comprise a control means for generating a control signal representative of the relative rate difference of said reference and sync signals. In the preferred case, the control signal is a function of the phase difference between these signals.

The flip-flop, as is conventional, remains in one mode until switched by an incoming signal.

Figure 2A:
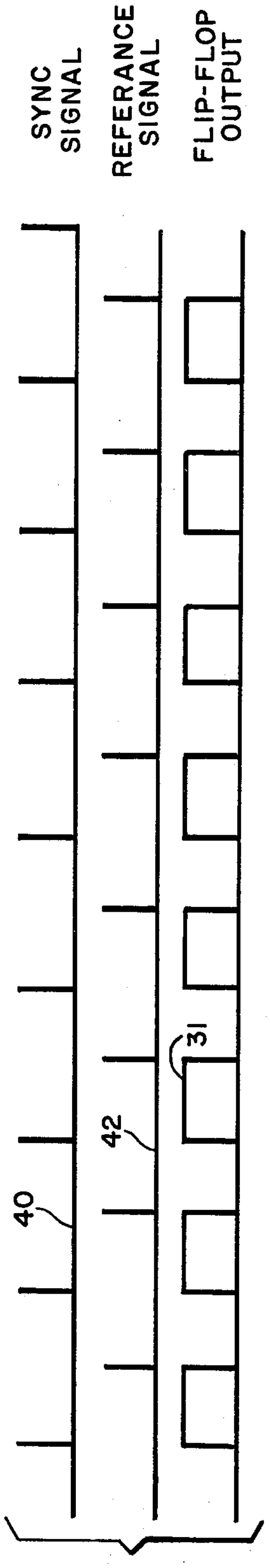
Figure 2B:
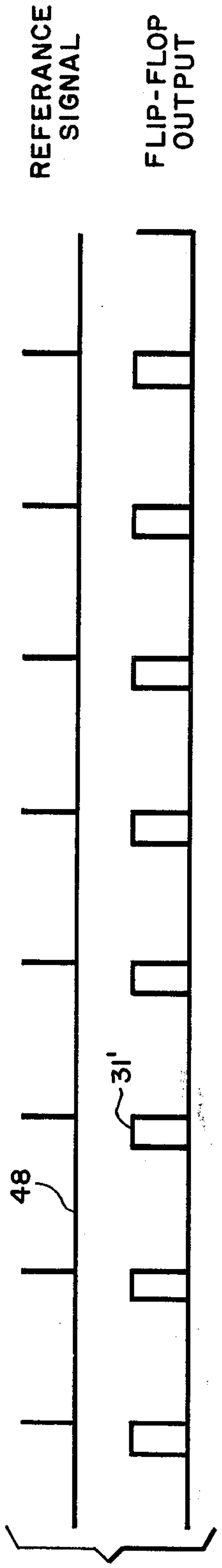

Referring to FIG. 2A, chart 40 represents a train of uniformly spaced sync signals such as can be obtained from the once-per-frame switch of a camera running at constant speed. Chart 42 represents a train of reference pulses eminating from the photosensor 15 under the assumed conditions that the speed of the sound recorder magnetic full-coat tape is matched to the speed of the motion picture camera film. The reference signal happens to occur half-way between the sync pulses.

The flip-flop 26 is assumed to be turned on by the sync pulse. The voltage at the output terminal 27 jumps positively, an increment. The next reference signal at terminal 28 turns the flip-flop off and voltage at terminal 27 drops incrementally to its former value. This sequence of events continues with time and the net result is a series of positive pulses 31 comprising intermediate control pulses at terminal 27. These control pulses are one-half as wide as the interval between sync signals, indicating a 50% phase difference between the sync and reference signals. The positive pulses 31 are coupled to the integrator 32 via terminal 34 and integrated to provide a slow varying d-c control voltage signal 37.

The integrator 32 has a built-in long time constant so that momentary and spurious variations in the amplitude or pulse width of the positive pulses have no noticeable effect on the control signal 37.

For the particular sound recorder identified above, it has been determined that a built-in two-second time constant in the integrator 32 avoids spurious effects of wow or hum.

The relatively long time constant also compensates for the momentary loss of sync signals. The long time constant prevents the control voltage from dropping, significantly, though a number of sync pulses are inoperative for any reason. In short, the long time constant acts like a flywheel.

The d-c control voltage 37 is coupled through a mode switch 38 which may be set for automatic control or manual control to input terminal 42 of an adder circuit 40. A second input terminal 44 of adder 40 is coupled to a manual control 48 which comprises a potentiometer 50 across a d-c power source such as battery 52.

The adder 40 arithmatically adds the manual control voltage and the control voltage from the integrator 32, to provide d-c supply power to terminal 46 to drive the sound recorder drive motor 12. In the manual mode, the manual control voltage is the sole supply voltage for the motor 12.

Suppose, for purposes of illustration, the reference signals, while synchronized with the sync signals, occur shortly after the sync pulses. See chart 48 in FIG. 2B. The train of intermediate control pulses 31′ from the flip-flop 26 have a shorter duration than those of chart 31. A phase lag of less than 180° is indicated. Accordingly, the resulting d-c control voltage from the integrator 32 is lower.

Since, as will be shown hereinafter, there is only one drive voltage that synchronizes the sound recorder to the sync signals, the difference must be made up by the manual control voltage. Similarly, when the phase lag between the sync signals and the reference signals exceed 180° when the sound and motion picture camera are matched, the manual control voltage is decreased initially from that required for the 180° phase difference to compensate for a higher control voltage signal. Thereafter, the control signal varies to compensate for variations in film or tape rate to match the film and tape rates, as explained hereinafter.

Figure 2C:
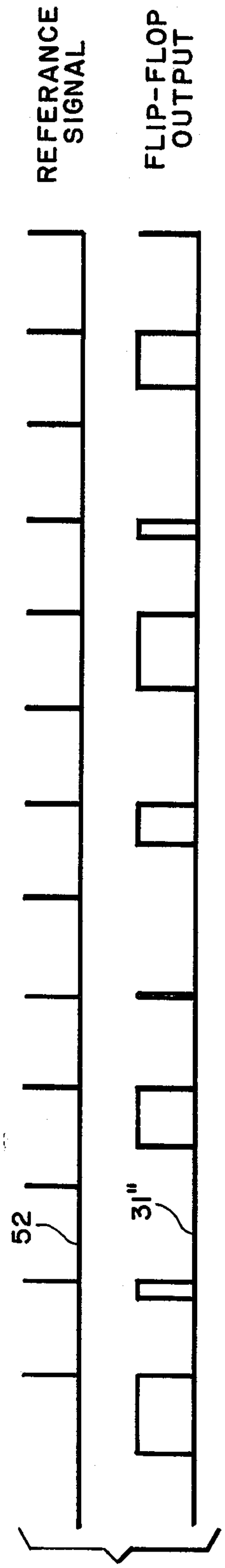
Figure 2D:
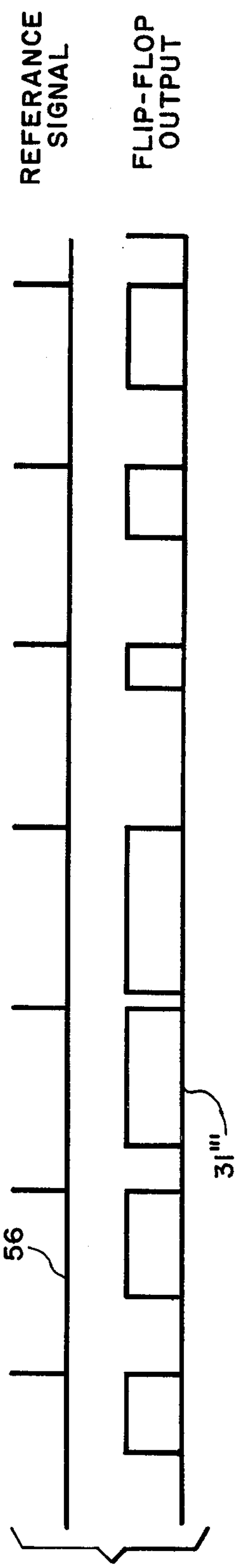

Differing speeds between the sound recording medium and motion picture film are synchronized as follows. The charts in FIG. 2C represent a condition where the reference signals occur at a faster rate than the sync signals. This, in turn, occurs when the sound tape is moving faster than the motion picture film. Note, the duration of the intermediate control pulses 31″ over a period of time tend to decrease. This tends to decrease the magnitude of the d-c control voltage at the output of the integrator 32. As a consequence, the drive voltage to the drive motor 12 decreases by an amount equal to the decrease in the control voltage if the manual control voltage remains constant.

The drive motor 12 tends to slow down when its drive voltage decreases until synchronism occurs. At synchronism the control voltage is constant and the drive motor speed is constant and locked to frame rate of the camera.

Similarly, if the reference signals occur at a slower rate than the sync signals (see chart 56 in FIG. 2D), the duration of the intermediate control pulses 31‴ tend to increase thereby increasing the d-c control voltage and the drive voltage to the motor 12. The motor 12 speeds up increasing the reference signal rate until synchronism occurs.

The important consideration is to provide a drive voltage which is responsive to the phase difference of the sync and reference signals. The foregoing utilizes specific concepts utilizing pulse width as a function of the phase difference. Similar results can be obtained by other means as, for example, making pulse amplitude or pulse rate as a function of the phase difference.

Once the sync and reference signals are synchronized or matched, the servo systems locks them in synchronism, automatically.

Flipping the mode switch 38 into the manual mode permits the operator to vary the speed of the sound recorder motor 12 at will. This is particularly useful for special effects, sound stretching, and tight drop-in.

The servo system also includes a visual monitor in the form of a meter 33 which records the average value of the positive intermediate control pulses 31. At synchronism, the needle remains fixed within the center range of the meter. The position of the needle is indicative of the phase between the sync and the reference signals or the relative magnitudes of the control voltage and the manual control voltages.

When the sound recorder tape and the motion picture film are not synchronized, the needle is in constant motion. It will move off scale to the left for each frame lost if the sound recorder tape is moving too fast. It will move off scale to the right for each frame lost if the sound recorder tape is moving too slow. Synchronism is obtained by adjusting the manual control voltage until the needle comes to rest somewhere in the mid range.

Since the speed of the magnetic full-coat film is matched to complement the speed of the motion picture film on a sprocket hole to sprocket hole or frame to frame basis, editing can be accomplished by simply counting sprocket holes or by moving sound and film together on synchronizer blocks and editing tables.

The preferred embodiment utilizing Super 8 magnetic full-coat film and an inexpensive off-the-shelf recorder was described because this type of system is about one-fifth to one-tenth of the cost of comparable 16 and 35 mm equipment. The average cost of film stock and other expendables is about one-half.

It is to be emphasized, however, that the phase locked servo system described above may be used with synchronizing means other than the sprocket holes. The synchronizer can be made to operate with prerecorded magnetic or optical synchronizing means.

Clearly, it is possible to interlock multiple recorders for dubbing simultaneous music, effects and narration tracks.

An entirely new mode of editing 16 mm sound is possible. A Super 8 reduction workprint may be purchased and then edited with sound on Super 8 magnetic full-coat film on a frame-per-frame basis. When editing is completed, the 16 mm film can be conformed on a frame-per-frame basis.

The synchronizer permits a sound track of Super 8 magnetic full-coat, produced as described, to be synchronized with an 8 mm or 16 mm projector equipped with a once-a-frame switch, to provide a frame rate sync signal.

The sound recorder described also self-resolves (matches its speed) to a 60 Hz AC line, which is the industry standard laboratory sync reference.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. A synchronizer for a motion picture sound recorder comprising:

means for generating sync signals representative of film advancement of motion picture film;

sound synchronizing means for supplying reference signals representative of the sound recording rate;

means coupled to said sound synchronizing means and said means for generating said sync signals for generating intermediate control pulses having a duration representative of the phase difference between the sync and reference signals;

means for converting said pulses to a d-c control signal, the amplitude of which is a function of the duration of the intermediate control pulses; and d-c drive means for controlling the sound recorder drive rate, said d-c drive means being coupled to said d-c control voltage and at least partially energized thereby.

2. A synchronizer for a motion picture sound recorder as described in claim 1 wherein the d-c drive means includes in addition a manual control means for supplying at least a portion of the d-c power supply for said d-c motor.

3. A synchronizer for a motion picture sound recorder comprising:

means for generating sync signals representative of film advancement of motion picture film;

a magnetic recording means having a d-c tape driving motor adapted to use full-coat magnetic tape having sprocket holes;

means for generating reference signals that are synchronized to said sprocket holes;

means coupled to said means for generating said reference signals and to said means for generating said sync signals responsive to the phase difference between the sync and reference signals for generating intermediate control signals representative of the phase difference between the sync and reference signals; and means for converting said intermediate control signals to a d-c control signal representative of said phase difference, said d-c control signal being coupled to said d-c driving motor for controlling the speed of said driving motor.

4. A synchronizer for a motion picture sound recorder as described in claim 3 which includes in addition a manual control means for supplying a manual d-c control voltage, an adder coupled to said manual d-c control voltage and said d-c control signal for generating a d-c drive voltage which is the sum of said manual control signal and said d-c control signal.

5. A synchronizer for a motion picture sound recorder as described in claim 3 which includes in addition signal processing means for converting external signals into sync signals.

6. A synchronized sound and motion picture recording system comprising:

a motion picture recording means having picture synchronizing means for producing a train of sync signals representative of the motion picture recording rate;

sound recording means having sound synchronizing means for producing a reference signal representative of the sound recording rate;

control means coupled to said reference and coupled directly to said sync signals for generating a drive signal representative of the relative rate difference of said reference and sync signals; and driving means which is responsive to and a function of said drive signal for controlling the sound recording rate for synchronizing the sound recording rate directly to said motion picture recording rate.

7. A synchronized sound and motion picture recording system as defined in claim 6 wherein the motion picture recording means is a camera using film and the sound recording means if full-coat magnetic tape and the motion picture and sound recording synchronizing means provide sync and reference signals that are representative of the frame rate of the film and the full-coat sprocket hole rate, respectively.

8. A synchronized sound and motion picture recording system as defined in claim 6 wherein the relative rate difference of said reference and sync signals is a phase difference.

9. A synchronized sound and motion picture recording system as defined in claim 8 wherein the drive signal is the power supply means of said driving means.

10. A synchronized sound and motion picture recording system as defined in claim 9 wherein the driving means is a d-c motor and the drive signal is a d-c power supply means having a magnitude which is a function of the relative rate difference between the reference and sync signals.

11. A synchronized sound and motion picture recording system as defined in claim 10 wherein the measure of the relative rate difference is a phase difference between the sync and reference signals.

12. A synchronized sound and motion picture recording system comprising:

motion picture camera having means for generating sync signals representative of the frame rate of the camera;

sound recording means utilizing a sound recording medium on complementary motion picture film stock, said sound recording means generating reference signals derived from the sprocket holes of the film stock;

control means comprising a flip-flop coupled to said reference signals and said sync signals for generating a positive pulse, the width of which is a function of the phase difference between the reference signals and the sync signals;

means for converting the pulse signals to a d-c drive signal having a magnitude which is directly related to the width of the pulses; and driving means for the sound recording means which is responsive to and a function of said drive signals for controlling the recording rate.

13. A synchronized sound and motion picture recording system as described in claim 12 wherein the means for generating the sync signals is the camera switch, the sound recorder means is magnetic, the means for generating the reference signals is a photoelectric pulse generator, the control means includes an integrator for generating a d-c voltage having a magnitude representative of the phase difference of said reference and sync signals, and said driving means is a d-c motor which derives its supply voltage from the integrator.

* * * * *